(12) United States Patent
Seo et al.

(10) Patent No.: US 10,992,008 B2
(45) Date of Patent: Apr. 27, 2021

(54) DRAWER-TYPE BATTERY PACK

(71) Applicant: LG CHEM, LTD., Seoul (KR)

(72) Inventors: Sung-Won Seo, Daejeon (KR); Dal-Mo Kang, Daejeon (KR); Jeong-O Mun, Daejeon (KR); Yoon-Koo Lee, Daejeon (KR); Ho-June Chi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 143 days.

(21) Appl. No.: 16/338,420

(22) PCT Filed: Apr. 2, 2018

(86) PCT No.: PCT/KR2018/003869
§ 371 (c)(1),
(2) Date: Mar. 29, 2019

(87) PCT Pub. No.: WO2018/190552
PCT Pub. Date: Oct. 18, 2018

(65) Prior Publication Data
US 2020/0044211 A1    Feb. 6, 2020

(30) Foreign Application Priority Data

Apr. 14, 2017 (KR) .................. 10-2017-0048650

(51) Int. Cl.
*H01M 50/20* (2021.01)
*H01M 50/147* (2021.01)

(52) U.S. Cl.
CPC ......... *H01M 50/20* (2021.01); *H01M 50/147* (2021.01); *H01M 2220/20* (2013.01)

(58) Field of Classification Search
CPC .... H01M 2/1077; H01M 2/043; H01M 50/20; H01M 50/147; H01M 2220/20
See application file for complete search history.

(56) References Cited

U.S. PATENT DOCUMENTS

| | | | |
|---|---|---|---|
| 5,833,023 | A | 11/1998 | Shimizu |
| 2004/0134699 | A1 | 7/2004 | Shimizu |
| 2009/0159354 | A1 | 6/2009 | Jiang et al. |
| 2011/0129704 | A1 | 6/2011 | Han et al. |

(Continued)

FOREIGN PATENT DOCUMENTS

| | | |
|---|---|---|
| CN | 102082251 A | 6/2011 |
| CN | 103287246 A | 9/2013 |

(Continued)

OTHER PUBLICATIONS

International Search Report for PCT/KR2018/003869 (PCT/ISA/210) dated Aug. 3, 2018.

*Primary Examiner* — Jimmy Vo
(74) *Attorney, Agent, or Firm* — Birch, Stewart, Kolasch & Birch, LLP

(57) ABSTRACT

A battery including a pack housing and a plurality of battery modules accommodated in the pack housing, the pack housing has first and second sides, the first and second sides having openings, and the openings of the first side correspond to respective openings of the second side, the pack housing has a plurality of guide grooves, and each battery module is accommodated into or removed from an inner space of the pack housing through a respective opening by sliding along the guide grooves.

9 Claims, 7 Drawing Sheets

(56) References Cited

U.S. PATENT DOCUMENTS

| | | | |
|---|---|---|---|
| 2013/0045403 A1* | 2/2013 | Shin | H01M 2/206 429/90 |
| 2013/0181510 A1 | 7/2013 | Ichikawa | |
| 2013/0323551 A1 | 12/2013 | Lee et al. | |
| 2015/0010791 A1 | 1/2015 | Ahn et al. | |
| 2015/0064522 A1 | 3/2015 | Kim | |
| 2015/0132630 A1 | 5/2015 | Kim et al. | |
| 2015/0155533 A1 | 6/2015 | Kim et al. | |
| 2015/0270514 A1 | 9/2015 | Baek et al. | |
| 2016/0006006 A1* | 1/2016 | Motokawa | H01M 2/1077 429/54 |

FOREIGN PATENT DOCUMENTS

| | | |
|---|---|---|
| CN | 104600225 A | 5/2015 |
| CN | 206022473 U | 3/2017 |
| JP | 6-18042 U | 3/1994 |
| JP | 7-8949 U | 2/1995 |
| JP | 7-47842 A | 2/1995 |
| JP | 10-287138 A | 10/1998 |
| JP | 2000-90900 A | 3/2000 |
| JP | 2001-15090 A | 1/2001 |
| JP | 2004-9986 A | 1/2004 |
| JP | 2011-204577 A | 10/2011 |
| JP | 2013-137918 A | 7/2013 |
| JP | 2014-191911 A | 10/2014 |
| JP | 2017-195070 A | 10/2017 |
| KR | 10-2010-0084703 A | 7/2010 |
| KR | 10-1011258 B1 | 1/2011 |
| KR | 10-2012-0058043 A | 6/2012 |
| KR | 10-2012-0120663 A | 11/2012 |
| KR | 10-2014-0010234 A | 1/2014 |
| KR | 10-2014-0011664 A | 1/2014 |
| KR | 10-2015-0025560 A | 3/2015 |
| KR | 10-2017-0025073 A | 3/2017 |
| WO | WO 2014/168378 A1 | 10/2014 |
| WO | WO 2015/050281 A1 | 4/2015 |

* cited by examiner

DRAWER-TYPE BATTERY PACK

CROSS-REFERENCE TO RELATED APPLICATIONS

The present application claims the benefit of Korean Patent Application No. 10-2017-0048650 filed on Apr. 14, 2017 with the Korean Intellectual Property Office, the disclosure of which is incorporated herein by reference in its entirety.

TECHNICAL FIELD

The present disclosure relates to a drawer-type battery pack, and more particularly, to a battery pack having a plurality of battery modules which have side plates serving as crash beams.

BACKGROUND ART

As devices powered by electrochemical energy are being developed, the need for a battery pack having high energy density is increasing.

In particular, in the case of a battery pack for a vehicle, a crash beam is essentially installed in order to endure an impact applied from the outside. However, the space occupied by the crash beam is not small, and the space occupied by the crash beam is not able to be used for other purposes. For this reason, there is inefficiency in terms of space utilization.

Referring to FIG. 1, a conventional battery pack structure to which a crash beam is applied is shown.

As shown in FIG. 1, in the conventional battery pack, a crash beam 2 with a predetermined thickness is disposed between every adjacent battery modules 1, and a battery module 1 is placed between every pair of crash beams.

In this configuration of the battery pack, when the battery module 1 is inserted into each insertion space, the battery module 1 is inserted and fixed in a downward direction. In this case, if the battery module 1 is firmly coupled to a pack housing 3, a lot of time is inevitably taken for the maintenance of the battery module 1.

Moreover, the battery pack of this configuration requires the space occupied by the crash beams 2 disposed between every adjacent battery modules, in addition to the space occupied by the battery module 1, and thus there is a loss in terms of energy density.

DISCLOSURE

Technical Problem

The present disclosure is designed to solve the problems of the related art, and therefore the present disclosure is directed to providing a battery pack that is configured to allow improved maintenance by effectively utilizing the space occupied by a crash beam provided at the battery pack and ensuring easy attachment and detachment of battery modules.

However, the technical object to be solved by the present disclosure is not limited to the above, and other objects not mentioned herein will be clearly understood by those skilled in the art from the following disclosure.

Technical Solution

In one aspect of the present disclosure, there is provided a battery pack, which includes a pack housing and a plurality of battery modules accommodated in the pack housing, wherein the pack housing has first and second sides, the first and second sides having openings, and the openings of the first side correspond to respective openings of the second side, wherein the pack housing has a plurality of guide grooves, and wherein each battery module is accommodated into or removed from an inner space of the pack housing through a respective opening by sliding along the guide grooves.

Each battery module may include: a battery cell stack; and a module case configured to accommodate the battery cell stack.

Each module case may have a pair of crash plates facing each other.

Each crash plate may have sliding protrusions formed at edges of upper and lower surfaces thereof and has a shape corresponding to the guide grooves.

At least one pair of battery modules is provided in respective openings of the pack housing at first and second sides, respectively, to face each other and the at least one pair of battery modules are may be physically connected to each other by a connection member.

An empty space may be formed between adjacent battery modules of the plurality of battery modules.

The battery pack may further comprise two pack covers, each pack cover covering an opening at a respective one of the first and the second side of the pack housing and each pack cover is fixed to battery modules of the plurality of battery modules.

Advantageous Effects

According to an embodiment of the present disclosure, the space occupied by crash beams provided at the battery pack may be efficiently utilized.

According to another embodiment of the present disclosure, since each battery module of the battery pack may be easily attached and detached, the maintenance for the battery pack may be performed more efficiently.

According to another embodiment of the present disclosure, even though an event such as an ignition occurs at some battery modules, it is possible to minimize the transfer of the event to nearby battery modules, and thus the battery pack may be used more safely.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, referring to FIG. 2, the overall structure of a battery pack according to an embodiment of the present disclosure will be described.

Figure 1:
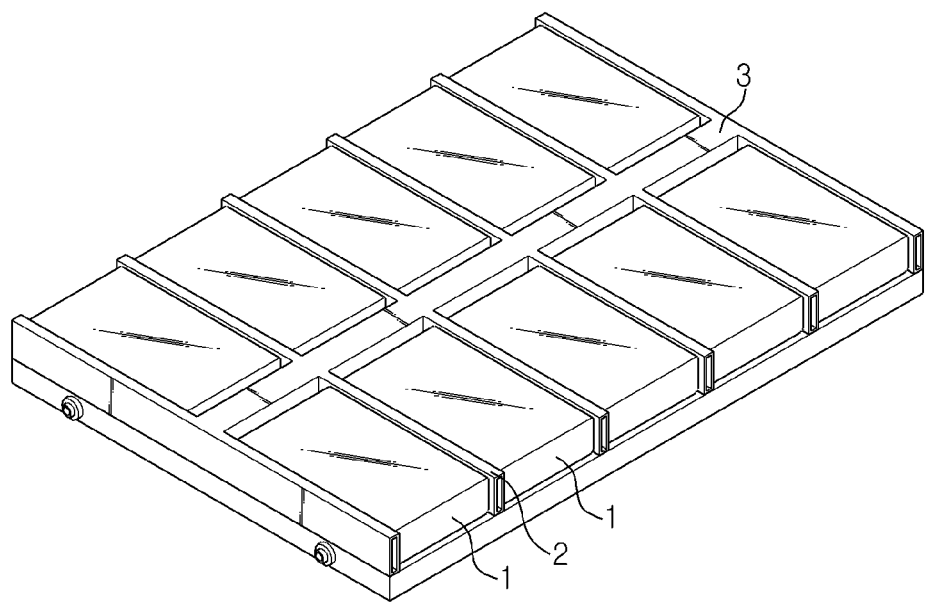
FIG. 1 is a diagram showing a conventional battery pack.
Figure 2:
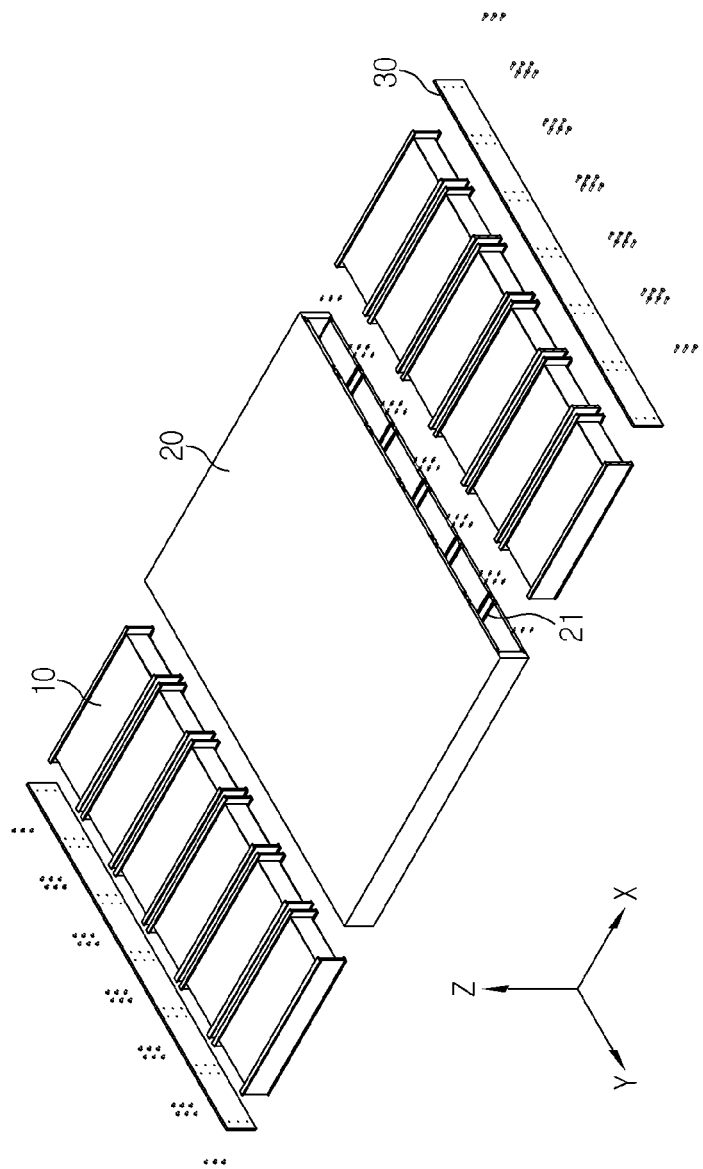
FIG. 2 is an exploded perspective view showing a battery pack according to an embodiment of the present disclosure.

FIG. 2 is an exploded perspective view showing a battery pack according to an embodiment of the present disclosure.

Referring to FIG. 2, a battery pack according to an embodiment of the present disclosure includes a plurality of battery modules 10 and a pack housing 20 for accommodating the battery modules 10. Also, pack covers 30 covering openings formed at both sides of the pack housing 20 may be further provided.

The pack housing 20 includes a plurality of guide grooves 21, and each battery module 10 is slidably moved along the guide grooves to be accommodated in or removed from an inner space of the pack housing 20 through the openings.

That is, the battery pack according to the present disclosure is a drawer-type battery pack in which the battery module 10 is slidably pushed to be mounted or slidably pulled to be detached through the openings at both sides of the pack housing 20.

Next, referring to FIGS. 3 to 5, the structure of the battery module 10 applied to the present disclosure will be described in detail.

Figure 3:
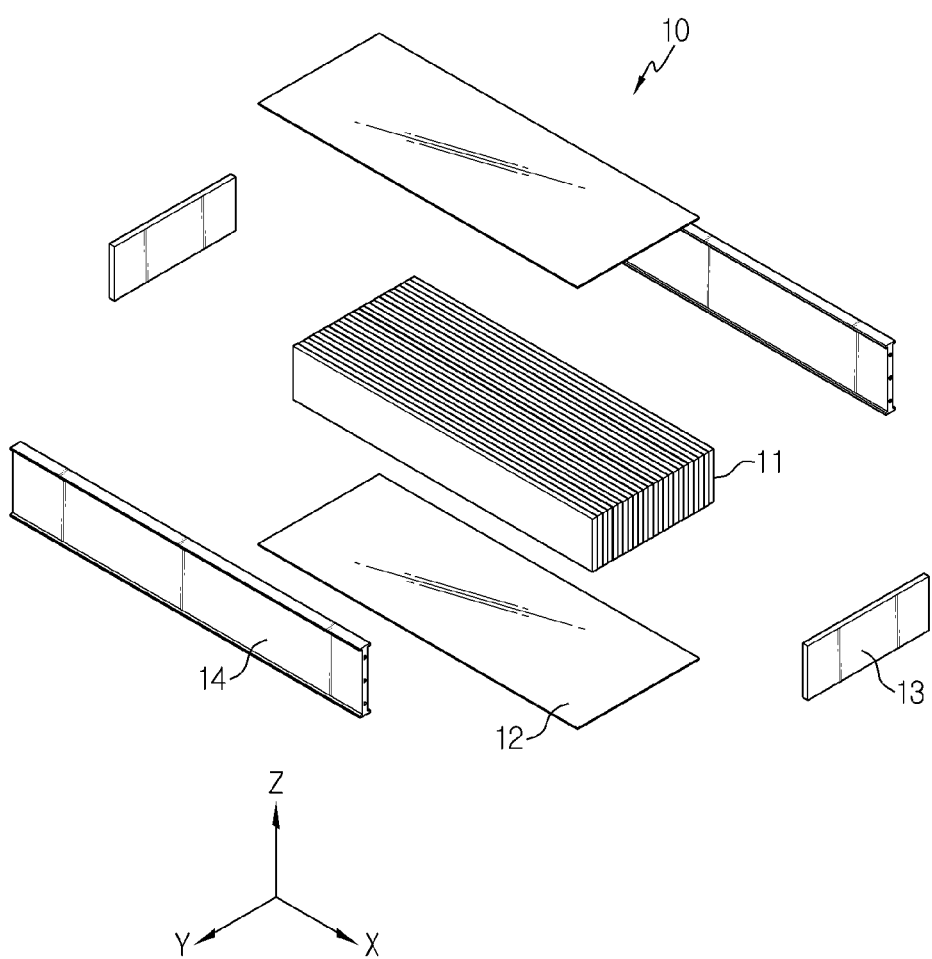
FIG. 3 is an exploded perspective view showing a battery module applied to the battery pack according to an embodiment of the present disclosure.
Figure 4:
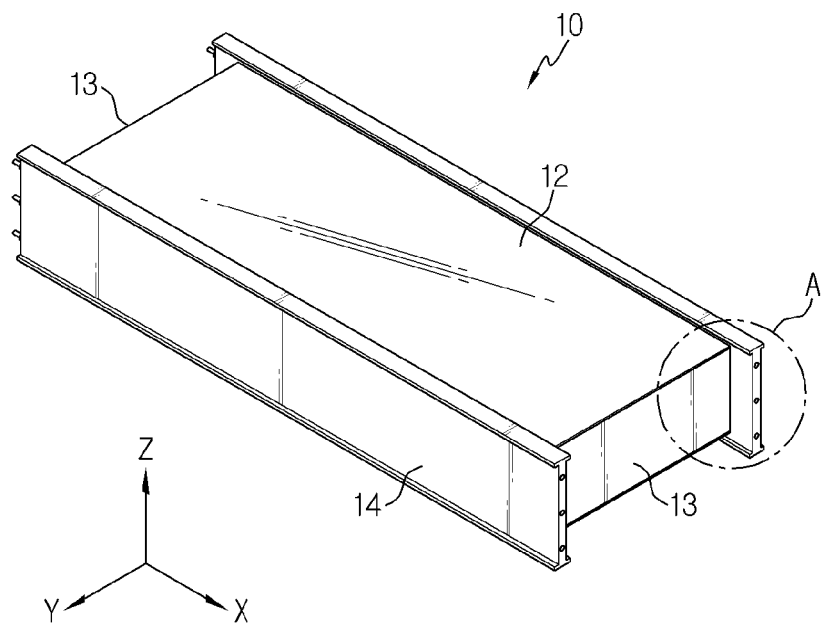
FIG. 4 is a perspective view showing an assembled battery module applied to the battery pack according to an embodiment of the present disclosure.

FIG. 3 is an exploded perspective view showing a battery module applied to the battery pack according to an embodiment of the present disclosure, and FIG. 4 is a perspective view showing an assembled battery module applied to the battery pack according to an embodiment of the present disclosure. In addition, FIG. 5 is an enlarged view showing a portion (a portion A of FIG. 4) of the battery pack according to an embodiment of the present disclosure.

Figure 5:
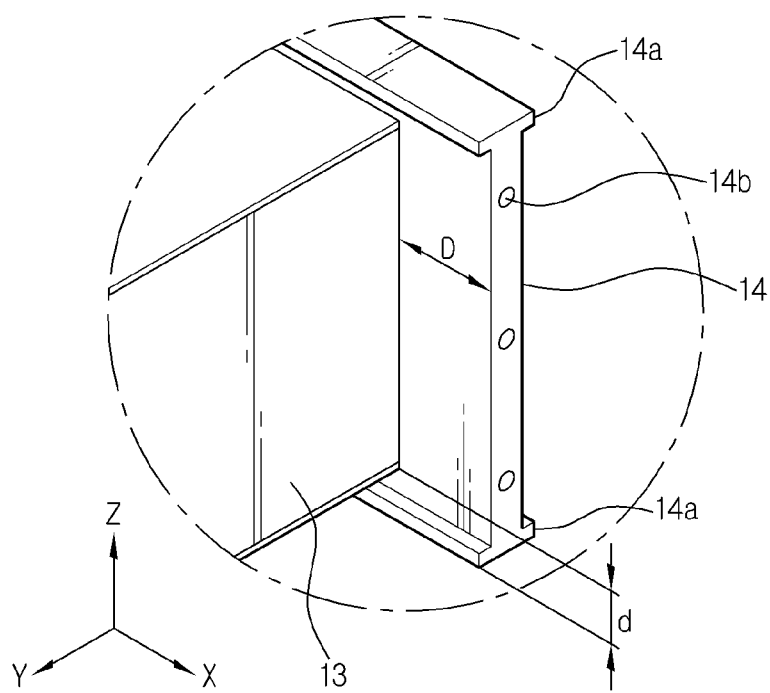
FIG. 5 is an enlarged view showing a portion of the battery pack according to an embodiment of the present disclosure.

Referring to FIGS. 3 to 5, the battery module 10 according to the present disclosure includes a cell stack 11 configured by stacking a plurality of battery cells and a module case for accommodating the cell stack 11.

The battery cell in the cell stack 11 may be, for example, a pouch-type battery cell. In this case, the plurality of battery cells may be electrically connected in series or in parallel, or both in series and in parallel, by connecting electrode leads respectively drawn out from the plurality of battery cells.

The module case includes a pair of first cover plates 12, a pair of second cover plates 13, and a pair of crash plates 14. Each plate of the module case may be made of a metal material such as aluminum (Al). In this case, the plates may be coupled to each other by welding or bolting.

The pair of first cover plates 12 covers upper and lower surfaces of the cell stack 11 having a rectangular parallelepiped shape as a whole, and the pair of second cover plates 13 covers front and rear surfaces of the cell stack 11, respectively.

Meanwhile, the pair of crash plates 14 covers both left and right sides of the cell stack 11 and is used to secure the structural rigidity of the battery pack. Thus, the pair of crash plates 14 may have a greater thickness than that of the other plates 12, 13.

In other words, the crash plate 14 according to the present disclosure may serve as a part of the case of the battery module and also perform a function of a crash beam that is used for the structural rigidity in the existing battery pack.

Sliding protrusions 14a shaped corresponding to the guide grooves 21 of the pack housing 20 are formed at edges of upper and lower surfaces of the crash plate 14 so as to be inserted into the guide grooves 21. In addition, coupling grooves 14b are formed at front and rear surfaces of the crash plate 14, which form the thickness of the crash plate 14, for physical connection with the crash plate 14 that is inserted at an opposite side or for coupling with the pack cover 30, explained later.

Meanwhile, the length of the crash plate 14 in the front and rear direction is longer than the length of the first cover plate 12 in the front and rear direction. Thus, as shown in FIG. 5, the crash plate 14 is further protruded in comparison to the second crash plate 13 as much as a predetermined distance D.

In addition, the width of the crash plate 14 in the vertical direction is further protruded as much as a predetermined distance d in comparison to the width of the second cover plate 13 in the vertical direction.

In the battery module 10, the crash plate 14 is further protruded in comparison to the first cover plate 12 and the second cover plate 13 as described above. Thus, when an impact is applied to the battery pack in the front and rear direction or in the vertical direction, it is possible to prevent the impact from being directly transferred to the cell stack 11.

Next, with reference to FIGS. 6 and 7, a way of detaching the battery module 10 from the battery pack according to an embodiment of the present disclosure and the internal structure of the battery pack in a state where the battery module 10 is mounted thereto will be described.

Figure 6:
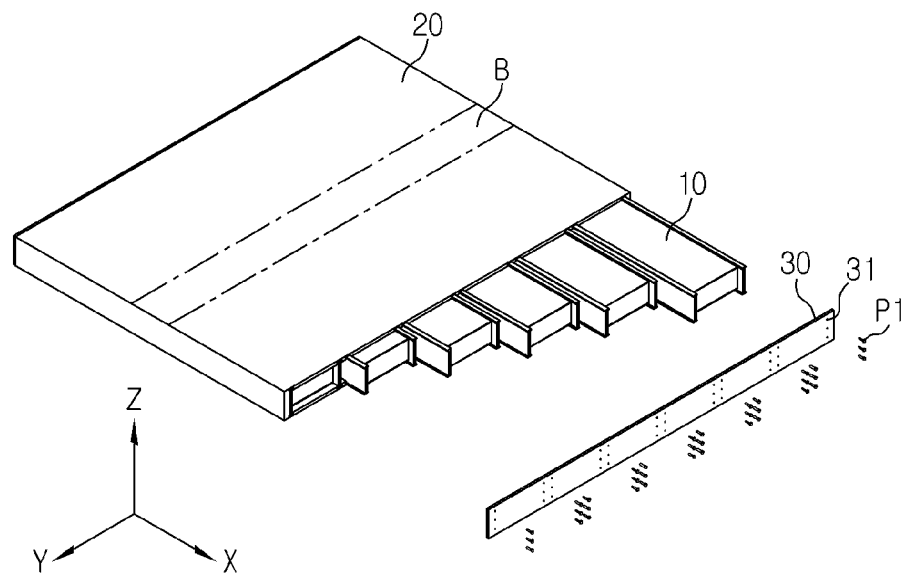
FIG. 6 is a diagram showing the battery pack according to an embodiment of the present disclosure, in which the battery module is being inserted into the pack housing.
Figure 7:
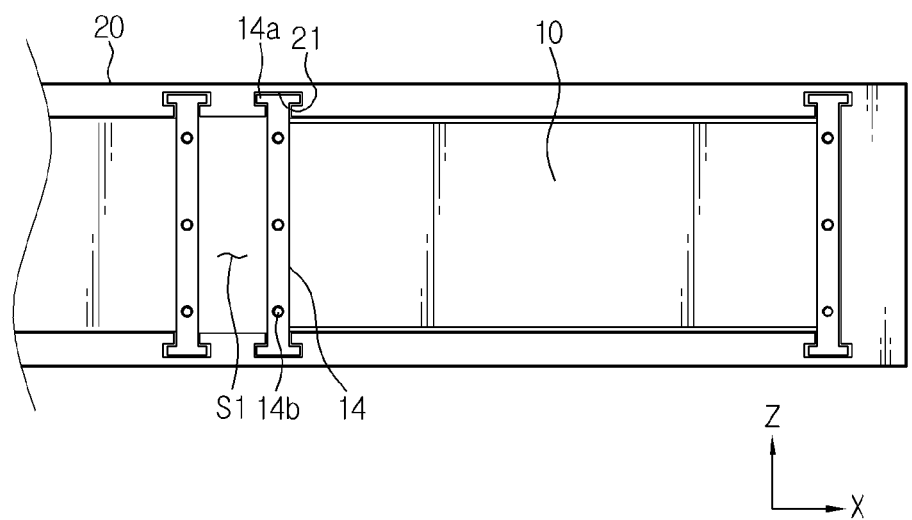
FIG. 7 is a partially enlarged view showing the battery pack according to an embodiment of the present disclosure, from which a fixed plate is removed.

FIG. 6 is a diagram showing the battery pack according to an embodiment of the present disclosure, in which the battery module is being inserted into the pack housing, and FIG. 7 is a partially enlarged view showing the battery pack according to an embodiment of the present disclosure, from which a fixed plate is removed.

Referring to FIGS. 6 and 7, the battery pack according to an embodiment of the present disclosure may be fabricated by slidably inserting the battery modules 10 through the openings formed at both sides of the pack housing 20, and then closing the openings formed at both sides by means of the pack covers 30.

The pack cover 30 has coupling holes 31 formed at positions corresponding to the coupling grooves 14b formed at the crash plate 14. The pack cover 30 is fixed to the crash plate 14 by coupling members P1 inserted into the coupling grooves 14b through the coupling holes 31 so that the battery modules 10 are coupled at the same time.

The coupling member P1 may be a screw or a rivet, among which the screw is more advantageous in view of the case where each battery module 10 needs to be taken out from the pack housing 20 for maintenance.

Meanwhile, referring to FIG. 7, the battery modules 10 disposed adjacent to each other in the lateral direction are spaced by a predetermined distance from each other due to the distance between the sliding grooves 21 adjacent to each other in the lateral direction. For this reason, an empty space S1 is formed between the adjacent battery modules 10. Thus, even though an event such as an ignition occurs at any one battery module 10, the event is not transferred to the neighboring battery modules 10, thereby ensuring the safety of the battery pack in use.

Next, with reference to FIGS. 8 and 9, a connection structure between a pair of battery modules 10 inserted through the openings at opposite sides of the pack housing 20 will be described.

Figure 8:
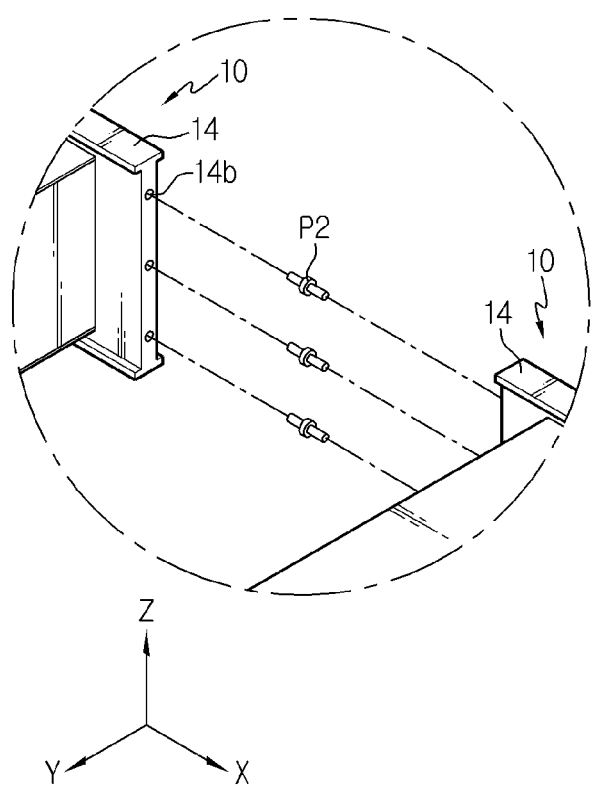
FIG. 8 is a diagram showing a physically connection between facing crash plates of facing battery modules.
Figure 9:
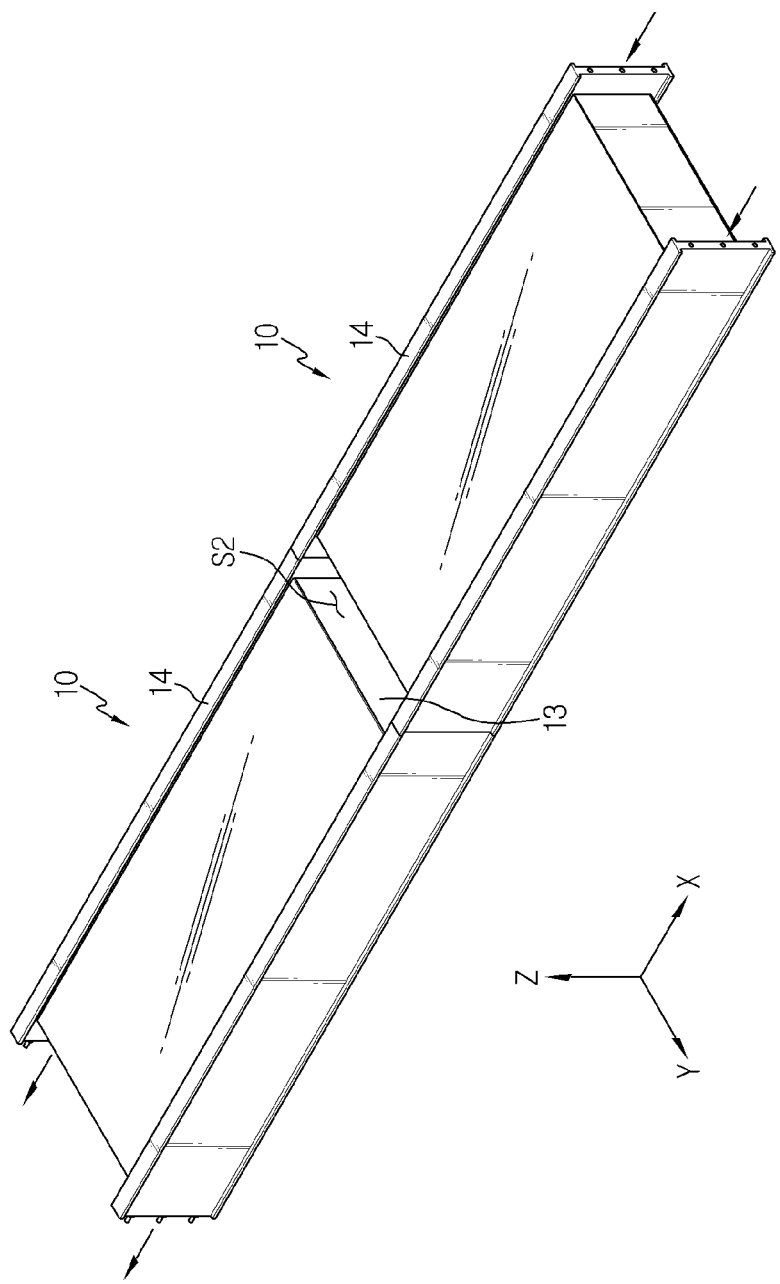
FIG. 9 is a diagram showing a direction in which a force applied to the crash plate is transferred.

FIG. 8 is a diagram showing a physically connection between facing crash plates of facing battery modules, and FIG. 9 is a diagram showing a direction in which a force applied to the crash plate is transferred.

First, referring to FIG. 8, the pair of battery modules 20 inserted through the openings located at the opposite sides of the pack housing 20 may be physically connected to each other by using a connection member P2.

At this time, the connection member P2 may be a connecting pin that is inserted into the insert grooves 14b to simply physically connect the pair of crash plates 14 without coupling the pair of crash plates 14. Alternatively, the connection member P2 may also be a bi-directional piece or screw that couples the pair of crash plate 14 to each other.

Referring to FIG. 9, in case of the battery modules 10 inserted through the openings located at the opposite sides of the pack housing 20 and disposed in parallel to each other, only the crash plates 14 thereof are physically connected to each other, and the other portion other than the crash plates 14 are not in contact with each other to form an empty space S2 between the pair of battery modules 10, which is surrounded by the second cover plates 13 and the crash plates 14.

Thus, even though an impact is applied to the battery pack along the arrow depicted in FIG. 9, the impact is substantially not transferred to the cell stack 11 located in the battery module 10 but transferred only through the crash plates 14 connected to each other, so that the interior of the battery modules 10 are not damaged.

In addition, since the empty space S2 is formed between the pair of battery modules 10, it is also possible to prevent an event such as an ignition occurring at any one battery module 10 from being transferred to other battery module 10 located in parallel thereto, thereby ensuring the safety of the battery in use.

Meanwhile, referring to FIGS. 6 and 9 together, a bus bar may be disposed in the empty space S2 formed between the pair of battery modules 10 located side by side to electrically connect the pair of battery modules 10. In this case, a module terminal may be drawn out of the second cover plate 13 of each battery module 10 and connected to the bus bar, or the module case of the battery module 10 may function as a terminal with polarity by itself to be connected to the bus bar.

In addition, the pack housing 20 may have a cut portion B formed at a position corresponding to the empty space S2 where the bus bar is located, namely a central portion in the front and rear direction on the upper surface of the pack housing 20, to connect a plurality of bus bars to each other at the outside of the battery pack so that more battery modules are electrical connected.

As described above, in the battery pack according to the present disclosure, among the cover plates of the module case, the cover plates covering the left and right sides are configured to serve as crash beams. Thus, it is possible to save a space occupied by the crash beam and thus exhibit a high energy density in comparison to a conventional battery pack.

In addition, in the battery pack according to an embodiment of the present disclosure, due to the empty spaces S1, S2 formed between the battery modules 10 adjacent to each other, it is possible to prevent an event such as an ignition occurring at any one battery module 10 from being transferred to neighboring battery modules 10, thereby ensuring the safety of the battery pack in use.

In the present disclosure, it would be understood by those skilled in the art that the terms indicating directions such as "front and rear direction", "lateral direction" and "vertical direction" refer to directions parallel to an x axis, a y axis, and a z axis on the coordinate depicted in the figures.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

10: battery module
11: cell stack
12: first plate
13: second plate
14: crash plate
14a: sliding protrusion
14b: coupling groove
20: pack housing
21: guide groove
30: pack cover
31: coupling hole
P1: coupling member
P2: connection member
B: cut portion

What is claimed is:
1. A battery pack, comprising:
a pack housing; and
a plurality of battery modules accommodated in the pack housing,
wherein the pack housing has a top wall, a bottom wall, a first side and a second side, the first side spaced from the second side in a first direction, a first end wall, and a second end wall, the first end wall spaced from the second end wall in a second direction, the top wall and bottom wall extending between the first end wall and second end wall, the first side and the second side each having openings, and the openings of the first side correspond to respective openings of the second side,
wherein an inner surface of each of the top wall and the bottom wall has a plurality of guide grooves extending in the first direction, wherein each of the plurality of battery modules has a sliding protrusion fitting into one of the plurality of guide grooves, wherein each battery module is accommodated into or removed from an inner space of the pack housing through a respective opening by sliding along the guide grooves, wherein each battery module includes:
   a battery cell stack; and
   a module case configured to accommodate the battery cell stack,
   wherein each module case has a pair of crash plates facing each other, wherein the sliding protrusions are formed at an upper edge and a lower edge of each crash plate, wherein each of the pair of crash plates extends in the first direction along a respective side of the battery modules, and wherein a length of each crash plate is greater than a length of the respective side of the battery module so as to extend beyond an end of the battery module.

2. The battery pack according to claim 1, wherein at least one pair of battery modules of the plurality of battery modules is provided in respective openings of the pack housing at first and second sides, respectively, to face each other, and
   wherein the at least one pair of battery modules are physically connected to each other by a connection member.

3. The battery pack according to claim 1, wherein an empty space is formed between battery modules of the plurality of battery modules adjacent to each other in the second direction.

4. The battery pack according to claim 1, further comprising:
   two pack covers, each pack cover covering an opening at a respective one of the first side and the second side of the pack housing,
   wherein each pack cover is fixed to battery modules of the plurality of battery modules.

5. The battery pack according to claim 1, wherein each of the plurality of grooves is T-shaped.

6. The battery pack according to claim 1, wherein a compartment is formed between two of the plurality of guide grooves, the compartment extending between the first side and the second side.

7. The battery pack according to claim 6, wherein the compartment accommodates two of the plurality of battery modules.

8. The battery pack according to claim 7, wherein the two of the plurality of battery modules are connected together.

9. The battery pack according to claim 1, wherein a width of the top wall in the second direction is greater than a width of one of the plurality of battery modules in the second direction.

* * * * *